Patented Jan. 1, 1929.

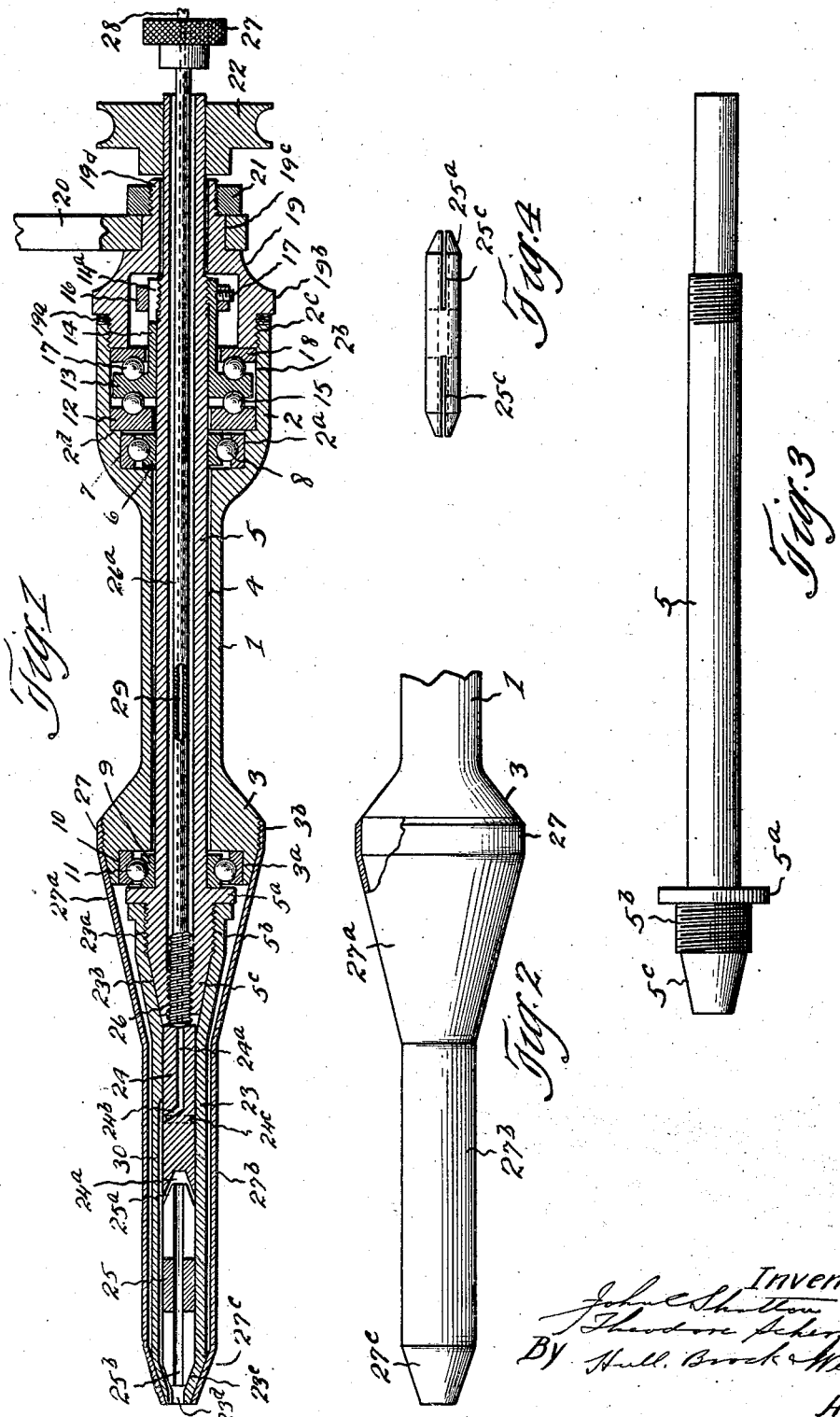

1,697,576

UNITED STATES PATENT OFFICE.

JOHN C. SHOTTON, OF LAKEWOOD, AND THEODORE SCHERF, OF CLEVELAND, OHIO.

DENTAL DRILL.

Application filed March 5, 1923. Serial No. 622,874.

This invention relates to drills and especially to drills of the type employed by dentists. It is the general purpose and object of the invention to improve the construction and operating efficiency of instruments of this character. A further and more limited object of the invention is to provide a drill for use by dentists which may be conveniently sterilized and maintained in a sterilized condition, and without disturbing the tool or any of the operating parts of the drill.

We realize the foregoing objects and other objects which will be referred to in detail hereinafter through the construction and arrangement of parts shown in the drawings, wherein Fig. 1 represents a central longitudinal section through a drill embodying our invention; Fig. 2 an elevation, with parts broken away, of the lower end of such drill, showing a slight modification of the shell-and-housing connection; Fig. 3 an elevation of the upper section of the rotatable spindle; and Fig. 4 an elevation of the drill chuck.

Describing the various parts by reference characters, 1 represents generally a housing, called in the trade a "handpiece" having an enlarged upper end 2 and an enlarged lower end 3, said enlarged ends constituting heads. The housing is provided with a central bore 4, the upper portion of which is expanded to provide two cylindrical chambers $2^a$ and $2^b$, the upper end of the chamber $2^b$ being provided with a thread, indicated at $2^c$. The lower end of the bore 4 is also enlarged to provide a cylindrical chamber $3^a$. The purposes of the cylindrical chambers will be explained hereinafter. The central bore 4 is for the reception of the upper section 5 of a hollow spindle, and the chambers $2^a$, $2^b$ and $3^a$ are provided for the accommodation of anti-friction thrust and radial bearings.

Within the chamber $2^a$ is a radial bearing comprising the inner race 6, the outer race 7 fitted within the wall of the chamber, and the interposed balls 8. A similar radial bearing is provided in the chamber $3^a$, said bearing comprising the inner race 9, an outer race 10, and the balls 11.

Seated upon the annular shoulder $2^d$ between the chambers $2^a$ and $2^b$ is the lower race 12 of a thrust bearing, the upper race for such bearing being formed in the lower surface of a heavy flange 13 which is carried at the lower end of a sleeve 14, the upper end of the sleeve being split, as indicated at $14^a$, and threaded onto the spindle 5. This threaded connection enables the sleeve and the flange 13 to be adjusted relatively to the spindle to compensate for wear in the bearings and upon the balls thereof. The upper split and threaded end of the sleeve may be rigidly secured to the cooperating portion of the spindle by means of a clamping collar 16 surrounding such end and having a set screw 17 extending through the collar and bearing at its inner end against the sleeve.

The upper surface of the flange 13 constitutes a lower race for an upper thrust bearing comprising the balls 17 and the upper race 18, the said latter race being adjustably clamped within the chamber $2^b$ by the lower end of a cap 19, which is threaded into the upper end of the housing 1, there being washers $19^a$ inserted between the flange $19^b$ and the upper end of the head 2; by removing such washers as occasion may require the thrust bearings may be adjusted to compensate for wear. The cap 19 is shown as provided with a cylindrical neck $19^c$ to which a support 20 is applied, the said support being held in place by means of a nut 21 threaded upon the upper end $19^d$ of said cap. At its upper end, the spindle 5 is provided with a pulley 22 by means of which it may be rotated, in the usual manner.

Below the bore 1, the spindle section 5 is provided with an outwardly projecting annular flange $5^a$, which is adapted to form a seat for the inner race 9. Below such flange the spindle section is provided with a threaded portion $5^b$, the lower end of the spindle section being downwardly tapered, as indicated at $5^c$.

The lower spindle section, indicated generally at 23, is shaped at its upper end to receive therein and to be threaded upon the lower end of the section 5, having an internal thread $23^a$ adapted to receive the thread $5^b$ and having a tapered or frusto-conical portion $23^b$ adapted to fit about the tapered frusto-conical portion $5^c$ of the section 5. The lower end of the section 23 is also tapered, as shown at $23^c$, and is provided with an axial opening $23^d$ through which the small drill tool may extend.

Mounted within the upper portion of the cylindrical bore of the spindle section 23 is a cylindrical plunger block 24 having within its lower end an upwardly tapered recess $24^a$. This tapered recess is adapted to engage either of the tapered ends 25ª, 25ᵇ of the drill chuck 25. Both ends of the chuck are slotted longitudinally, as indicated at 25ᶜ. The chuck shown herein is symmetrical as to both ends thereof, making it immaterial which end is to be engaged by the plunger block 24 and which end is to hold the operating drill.

For the purpose of establishing an operative connection between the chuck and the spindle, we provide a screw 26 having an elongated stem or shank 26ª and a knurled head 27, the screw being threaded into and through the lower end of the spindle member 5. By rotating the screw in the appropriate direction, the block or plunger 24 will be pressed downwardly into engagement with the upper end of the chuck 25, forcing the lower tapered end of the latter into gripping engagement with the drill tool and into driving frictional engagement with the inner tapered seat 23ᶜ provided therefor in the lower end of the spindle sections 23.

The lower enlargement 3 of the housing is provided with an external thread 3ᵇ on which there is threaded the upper end of a shell. This shell comprises the upper internally threaded cylindrical portion 27, a frusto-conical portion 27ª extending downwardly from such upper portion, and an extended cylindrical portion 27ᵇ surrounding the cylindrical portion of the spindle section 23, the lower end of the shell being also frusto-conical, as shown at 27ᶜ, to conform to the shape of the lower end of the said spindle section. Instead of being connected to the head 23 by means of a thread, the shell may have a tight sliding fit therewith, as indicated in Fig. 2; or any other convenient connection may be employed between these parts.

This shell constitutes an important part of our invention since it is the only part of the drill, aside from the operating tool, which engages the mouth of the patient. This shell can be quickly and conveniently removed and can be sterilized and replaced without disturbing the tool or any of the operating parts of the drill; in fact, several shells may be employed for the same drill and those not in actual use may be sterilized and kept sterile enabling the use of a sterilized shell for each patient without the delay incidental to re-sterilizing a single shell. The lower end of the spindle and the parts therein do not require sterilization, since they do not come in contact with the mouths of the patients.

The manner of connecting the two spindle sections insures a proper centering of both parts of the spindle and the true running of the spindle as a whole. The radial bearings insure practical absence of friction through the rotation of the drill spindle, while the arrangement of the thrust bearings and the manner of constructing the same minimize the friction due to thrusts exerted longitudinally of the drill and also provide a most effective means for adjusting and removing the parts to compensate from time to time for the wear incidental to such thrusts.

The reduced portion 1 of the housing and the tapered portion 27ª of the shell constitute a hand grip by which the drill may be conveniently operated, with such reduced portion resting in the crotch between the thumb and forefinger and the thumb and fingers grasping such tapered portion of the shell.

28 denotes a connection for air, water or other cooling fluid, said connection communicating with the upper end of the upper spindle section, which is provided with a central bore 29 for the passage of the fluid, the lower end of the bore communicating with a bore 24ª provided in the plunger block 24. At its lower end, the bore 24ª communicates by an inclined passage 24ᵇ with an annular passage 24ᶜ surrounding the said block, which annular passage in turn communicates with a vertical passage 30 formed within the inner wall of the lower spindle section and between the same and the plunger block 24 and the chuck 25. The lower end of this fluid passage is adapted to discharge the cooling fluid against the operating burr or drill tool and upon the "field" or cavity. This fluid serves to remove the ordinary causes of pain incidental to drilling a tooth by overcoming the heat due to friction; and it may also serve to remove the "chips" incidental to the work.

The manner of mounting the spindle enables the instrument to be operated, practically without vibration of the spindle and of the drill tool, thus removing one of the principal causes of pain incidental to the operation of drilling teeth. Also, a convenient adjustment is provided between the spindle and the bearings, whereby longitudinal vibration of the spindle may be avoided, the lateral vibration being taken care of by the radial bearings. Furthermore, should the bearings become worn and need replacement, the construction disclosed herein affords means whereby such replacement may be conveniently effected without the necessity for purchasing a new instrument. It should be noted also that, in our instrument, no oil is needed for any bearings below the flange 5ª. This enables the instrument to be operated without the disagreeable incident of having oil enter the mouth of the patient; and this result may be attained even when air or other fluid is introduced to the interior of the shell through the connection 28.

For convenience of description, it has been assumed that the drill is operated with the chuck and the drill tool at the lower end of the spindle, and the terms "upper" and "lower" are employed in the specification and claims in harmony with this assumption, but without any intention of limiting thereby the scope of the claims nor the manner of use of the instrument.

Having thus described our invention, what we claim is:

1. In an instrument of the character described, the combination of a housing having a chamber at one end thereof, a spindle rotatably mounted in said housing and extending through said chamber, the chamber having a lower end-thrust ball race surrounding the said spindle and an upper end-thrust ball race also surrounding said spindle, an intermediate ball race interposed between the first mentioned races and adjustably connected to said spindle, balls interposed between the upper and lower races and the intermediate race, and means for adjusting the upper race.

2. In an instrument of the character set forth, the combination of a housing having a chamber in the upper portion thereof, a spindle mounted in said housing and chamber, a pair of end-thrust bearings in said chamber, the said bearing comprising a lower race surrounding said spindle, an upper race surrounding said spindle, and intermediate race interposed between the first mentioned races, a sleeve to which the intermediate race is connected, the said sleeve being threaded on said spindle, balls interposed between said races, and means for securing the said sleeve in adjusted position upon said spindle.

3. In an instrument of the character set forth, the combination of a housing having a chamber at one end thereof, a spindle mounted in said housing and chamber, a pair of end thrust bearings in said chamber, the said bearings comprising a lower race surrounding said spindle, an upper race surrounding said spindle, an intermediate race interposed between the first mentioned races, a sleeve to which the intermediate race is connected, the said sleeve being split and threaded on said spindle, means for clamping said sleeve upon said spindle, balls interposed between said races, and means for adjusting the race which is adjacent to the enlarged end of said chamber.

4. In an instrument of the character described, the combination of a housing having a chamber at its upper end, a spindle mounted in said housing and chamber, a double end-thrust bearing in said chamber, the bearing comprising a lower race, an upper race, an intermediate race interposed between the first two races and adjustably connected to said spindle, balls interposed between the intermediate race and the upper and lower races, and a cap, through which said spindle extends, threaded into the upper end of the chamber and having a flange adapted to engage the upper race.

5. In an instrument of the character described, the combination of a housing, a spindle comprising an upper section mounted in said housing and projecting below the lower end thereof and having below such end a cylindrical threaded portion and a tapered portion below such threaded portion, and a lower spindle section threaded upon the threaded portion of the first-mentioned section and having a tapered portion cooperating with the tapered lower end of the first section, thereby to center said sections.

6. In an instrument of the character described, the combination of a housing having a lower head, a spindle comprising an upper section mounted in said housing and projecting below and journaled in the said head and having below such head a cylindrical threaded portion and a tapered portion below such threaded portion, and a lower spindle section threaded upon the threaded portion of the first mentioned section and having a tapered portion cooperating with the tapered lower end of the first section thereby to center said sections, and a shell removably connected to said head and surrounding the lower or operating portion of said spindle and disconnected therefrom.

7. An instrument of the character described comprising a housing having a chamber at one end thereof, a spindle mounted in said housing and extending beyond such chamber, the said spindle having an outwardly projecting flange, outside said chamber, a radial bearing having an inner race mounted on the spindle and resting on said flange, an outer race within said chamber, and balls interposed between said races.

8. In an instrument of the character described, the combination of a housing, a spindle rotatably mounted in said housing and projecting below the same, a shell detachably connected to the lower portion of the housing and surrounding and disconnected from the lower or operating portion of said spindle, and means for supplying fluid to the interior of said shell and through the space provided between the same and the lower portion of said spindle and in operative relation to a tool supported by said spindle.

9. In an instrument of the character described, the combination of a housing, a spindle rotatably mounted in said housing and projecting below the same, a shell detachably connected to said housing and surrounding the lower or operating portion of said spindle and disconnected therefrom and means for supplying fluid to the interior of said shell and from said shell into operative relation to a tool supported by said spindle.

10. In an instrument of the character described the combination of a housing having chambered ends, a spindle rotatably mounted in said housing and projecting through the lower end of the same, a radial bearing in each of said chambers surrounding said spindle, one or more end thrust bearings in one of said chambers surrounding said spindle, means whereby the relative position of the spindle and of the end thrust bearing or bearings may be varied, a shell detachably connected with said housing and covering the lower end of said spindle and a drill chuck arranged within said shell and adapted to connect said spindle with a drill.

11. In an instrument of the character described, the combination of a housing having an enlarged upper end and an enlarged lower end and an intermediate portion adapted for reception of a portion of the hand of the operator, a spindle mounted in and extending through said housing, said spindle having a bearing in the opposite ends of said housing and one or more end thrust bearings in one end of said housing and surrounding said spindle, a shell detachably connected with said housing and enclosing the lower end of said spindle and means arranged within said shell for connecting said spindle with a drill.

In testimony whereof, we hereunto affix our signatures.

JOHN C. SHOTTON.
THEODORE SCHERF.